(12) United States Patent
Chawla

(10) Patent No.: US 6,362,249 B2
(45) Date of Patent: *Mar. 26, 2002

(54) RADIATION-CURABLE COATING COMPOSITIONS, COATED OPTICAL FIBER, RADIATION-CURABLE MATRIX FORMING MATERIAL AND RIBBON ASSEMBLY

(75) Inventor: Chander P. Chawla, Batavia, IL (US)

(73) Assignee: DSM Desotech Inc., Elgin, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/148,772

(22) Filed: Sep. 4, 1998

(51) Int. Cl.$^7$ ............................. C08F 2/48; C08F 20/10
(52) U.S. Cl. ..................... 522/182; 522/181; 522/120; 522/121; 522/90; 522/116; 522/167; 522/96; 522/173; 522/174; 522/178; 522/179; 522/183
(58) Field of Search ...................... 522/120, 122, 522/182, 167, 116, 96, 173, 90, 178, 181, 179; 526/245, 328; 428/378

(56) References Cited

U.S. PATENT DOCUMENTS

| | | | |
|---|---|---|---|
| 4,427,823 A | * | 1/1984 | Inagaki et al. .............. 524/833 |
| 4,585,534 A | * | 4/1986 | Pasternack et al. ........... 522/31 |
| 4,753,996 A | * | 6/1988 | Sato ............................ 525/205 |
| 4,840,757 A | | 6/1989 | Blenkhorn .................... 264/22 |
| 4,925,727 A | | 5/1990 | Brown et al. ................ 428/199 |
| 4,995,028 A | | 2/1991 | Boling et al. ............. 369/275.5 |
| 5,024,507 A | * | 6/1991 | Minns et al. ............ 350/96.34 |
| 5,109,089 A | * | 4/1992 | Birkle et al. ................. 526/273 |
| 5,146,531 A | * | 9/1992 | Shustack ..................... 385/128 |
| 5,273,863 A | | 12/1993 | Horn et al. .................. 430/270 |
| 5,804,311 A | * | 9/1998 | Suwa et al. ................. 428/378 |

FOREIGN PATENT DOCUMENTS

| | | | |
|---|---|---|---|
| EP | 565 798 A1 | * | 11/1992 |
| WO | WO 95/23120 | | 8/1995 |
| WO | 95/23120 | * | 8/1995 |

* cited by examiner

Primary Examiner—James J. Seidleck
Assistant Examiner—Sanza McClendon
(74) Attorney, Agent, or Firm—Pillsbury Winthrop LLP

(57) ABSTRACT

A radiation-curable, optical fiber coating composition has enhanced color stabilization and is formulated from a composition containing at least one radiation-curable oligomer or monomer. A concentration of urethane and ether linkages in the radiation-curable composition is such that a cured optical fiber coating formed from said radiation-curable composition exhibits a ΔE of about 40 or less after being exposed for 96 hours to 150° C. and then for 144 hours to 180° C. Also provided is a radiation-curable optical fiber coating composition which is substantially urethane-free.

41 Claims, 1 Drawing Sheet

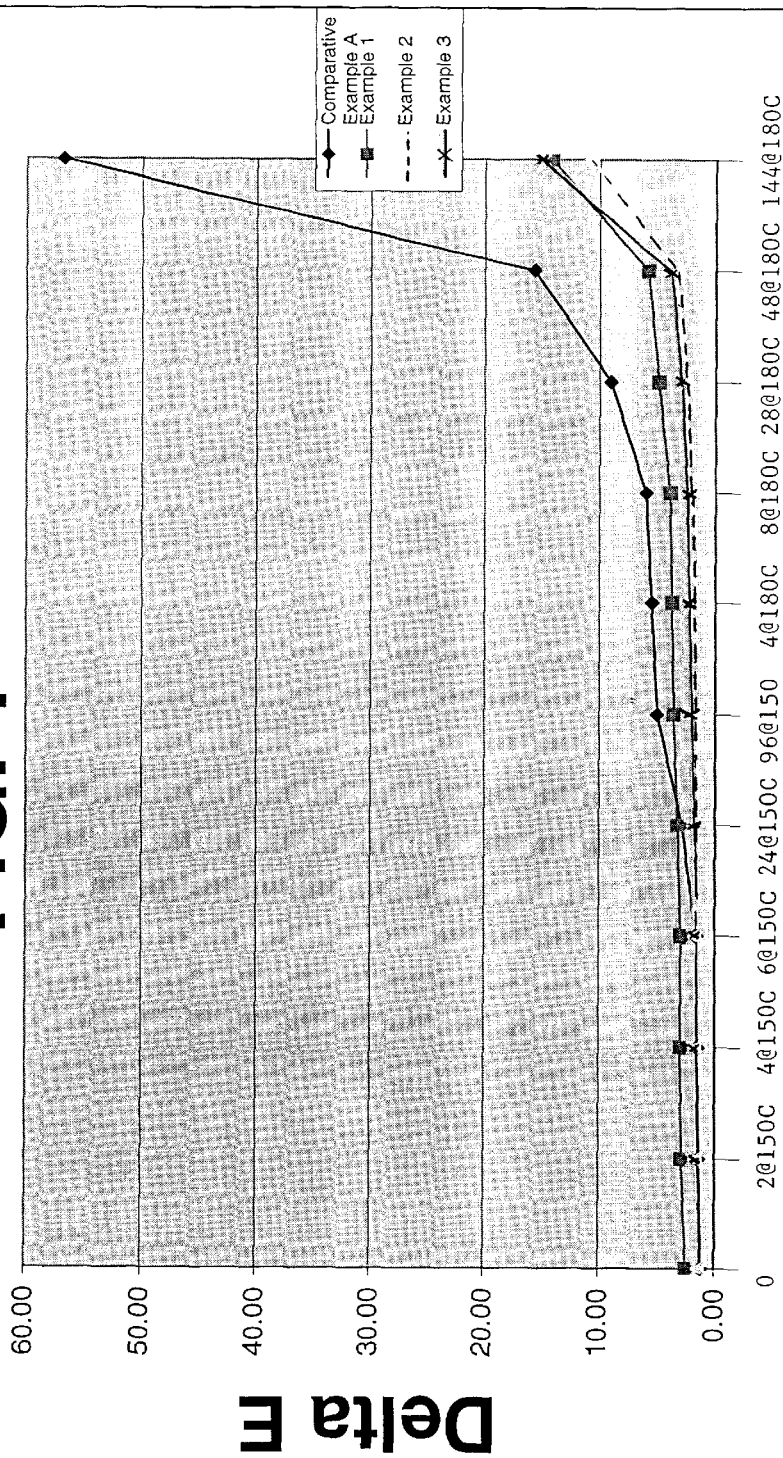

RADIATION-CURABLE COATING COMPOSITIONS, COATED OPTICAL FIBER, RADIATION-CURABLE MATRIX FORMING MATERIAL AND RIBBON ASSEMBLY

FIELD OF THE INVENTION

The present invention relates to radiation-curable, optical fiber coating compositions, which are adaptable for forming coatings such as inner primary coatings, outer primary coatings, colored secondary coatings, ink coatings, bundling materials, ribbon matrix materials and colored matrix materials on optical fibers. The compositions comprise acrylated acrylic oligomers. The present invention also relates to a coated optical fiber.

BACKGROUND OF RELATED ART

Radiation-curable compositions are vital to the optical fiber industry. Materials used in the manufacture of optical fibers are typically sensitive to environmental and handling stresses and can be made of glass, for example. Radiation-curable compositions have been formulated to provide protective coatings for sensitive optical fibers. Such compositions include, among others, inner primary coatings, outer primary coatings, colored outer primary coatings, single coatings, matrix materials, colored matrix materials, bundling materials, inks, adhesives, and upjacketting coatings. Optical fiber cable manufacturers increasingly demand better performance from these coating compositions in order to allow the optical fiber to function in a wider array of environments and have better transmission performance In addition, compositions are demanded which deliver high performance at reduced cost.

Optical fiber assemblies provide a modular design which simplifies the construction, installation and maintenance of optical fibers by eliminating the need to handle individual optical fibers. Examples of optical fiber assemblies include ribbon assemblies and cables. A typical optical fiber assembly is made of a plurality of coated optical fibers which are bonded together in a matrix material. Such optical fiber assemblies containing a plurality of coated optical fibers have been used for the purpose of multi-channel transmission. The matrix material can encase the optical fibers, or the matrix material can edge-bond the optical fibers together.

Coated optical fibers for use in optical fiber assemblies are usually coated with an outer colored layer, called an ink coating, or alternatively a colorant is added to the outer primary coating to facilitate identification of the individual coated optical fibers. Thus, the matrix material which binds the coated optical fibers together contacts the outer ink coating if present, or the colored outer primary coating.

When a single optical fiber of the assembly is to be fusion connected with another optical fiber or with a connector, an end part of the matrix layer can be removed to separate each of the optical fibers.

Desirably, the primary coatings on the coated optical fibers, and the ink coating if present, are removed simultaneously with the matrix material to provide bare portions on the surface of the optical fibers (hereinafter referred to as "ribbon stripping"). In ribbon stripping, the matrix material, primary coatings, and ink coating, are desirably removed as a cohesive unit to provide a clean, bare optical fiber which is substantially free of residue.

The production of and useful characteristics for coated optical fibers are discussed in, for example, U.S. Pat. No. 5,104,433, which is hereby incorporated by reference. Single mode or multimode fiber can be prepared. Step index and graded index fibers can be prepared. In the coated fiber, loss due to absorption, scattering, macrobending and microbending should be minimized. Avoiding microbending loss is particularly important. Optical fiber typically is about 125 microns in diameter, and coating layers of approximately 30 microns are applied thereto.

Optical fiber ribbons are described in, for example, U.S. Pat. No. 4,900,126 to Jackson et al.; U.S. Pat. No. 5,373,578 to Parker et al., U.S. Pat. No. 5,379,363 to Bonicel et al.; the complete disclosures of which are hereby incorporated by reference. Ribbon stripping is discussed in, for example: "Testing of 4- and 8-Fiber Ribbon Strippability", G. A. Mills, Int. Wire & Cable Symp. Proc., 1992, pgs. 472–474; "The Effect of Fiber Ribbon Component Materials on Mechanical and Environmental Performance", K. W. Jackson et al., Int. Wire & Cable Symp. Proc., 1993, pgs. 28–34; which are hereby incorporated by reference.

In addition to ribbon packaging, fiber designs can include tight buffer, loose tube, filled loose tube, and mini-bundle. Cables can be packaged by conventional buffering, stranding, and jacketing steps. Optical fiber fabrication is disclosed in, for example, the article "Fiber Optics" Encyclopedia of Chemical Technology, Vol. 10, 4th Ed., pg. 514–538, (John Wiley & Sons, 1993), which is hereby incorporated by reference.

Inner primary coatings, outer primary coatings and matrix materials are usually formed from radiation-curable systems. Ink coatings usually are formed from a pigment dispersed within a radiation-curable system. The UV curable systems contain a UV curable oligomer or monomer that is liquid before curing to facilitate application of the composition, and then a solid after being exposed to UV radiation.

Modern high speed optical fiber drawing towers and ribbon forming towers operate at a very high speed. Thus, the radiation-curable compositions for forming inner primary, outer primary and ink coatings must have a very fast cure speed to ensure complete cure of the coatings and matrix material. In addition, the compositions should not contain ingredients that can migrate to the surface of the optical fiber and cause corrosion. Such additives are "fugitive" or free to migrate from the cured coating. Fugitive additives are generally undesirable because they might, for example, migrate and attack the optical fiber or be incompatible and cause loss of optical clarity. The compositions should also not contain ingredients which can cause instability in the protective coatings or matrix material. Ink coatings for optical fibers should be color fast for decades. The coatings and matrix material should not cause attenuation of the signal transmission and be impervious to cabling gels and chemicals.

Each of the coatings on the optical fiber and matrix material should be resistant to degradation caused by heat or light which can result in discoloration or even loss of integrity of the coatings or matrix material. If coating integrity is lost, the optical fiber may not be adequately protected from the environment resulting in signal attenuation. If one of the coating layers discolors, misidentification of the individual optical fibers may occur during splicing. Thus, there is a need for a radiation-curable coating composition suitable for application as a coating on an optical fiber, such as an inner primary coating, outer primary coating, colored secondary coating, ink coating, bundling material, ribbon matrix material and colored matrix material that exhibits substantial resistance to degradation caused by heat or light.

Current optical fiber coatings and matrix materials utilize acrylate functional monomers and acrylate functional oligomers. The oligomer backbone is usually derived from one or more polyether, polycarbonate, polyester or hydrocarbon polyols bound together via urethane linkages, to which acrylate functional groups are bound via urethane linkages. Thus, the oligomers used are generally acrylated polyurethanes. Optical fiber coatings and matrix materials can degrade when exposed to heat, causing undesirable yellowing and even loss of integrity of the coating or matrix material. Thus, there is also a need for radiation-curable compositions which exhibit enhanced resistance to thermal degradation.

Urethane acrylate oligomers are most widely used in the industry. Organofunctional silane coupling agents (or "adhesion promoters") are also commonly used in the inner primary coating. For outer primary coatings, colored outer primary coatings and matrix materials, important additives include slip additives which function to lower the coefficient of friction of the cured material. A low coefficient of friction is important for processing and handling of coated optical fiber or optical fiber ribbon.

Typical urethane acrylate containing compositions have, upon cure, relatively high coefficients of friction. Therefore, despite problems associated with use of fugitive additives, slip additives are generally required in many cases to achieve the necessary performance. Hence, a need exists to lower the coefficient of friction of cured urethane acrylate compositions without the use of slip additives, and in particular, without fugitive slip additives.

From the above, it is clear that optical fiber technology places many unique demands on radiation-curable compositions which more conventional applications, such as printing inks and paints, do not.

Formulation and application of radiation-curable compositions for fiber optic materials in general and optical fiber coatings in particular can be found in, for example, U.S. Pat. Nos. 4,472,019; 4,572,610; 4,716,209; 5,093,386; 5,384,342; 5,456,984; 5,596,669; and copending U.S. Pat. application 08/701,428, which are hereby fully incorporated herein by reference. These patents demonstrate that urethane acrylate oligomers have become well-known in the optical fiber industry.

SUMMARY OF THE INVENTION

An objective of the present invention is to provide radiation-curable compositions that are adaptable for use as inner primary coatings, outer primary coatings, colored secondary coatings, ink coatings, bundling materials, ribbon matrix materials and colored matrix materials on optical fibers, which when suitably cured exhibit enhanced resistance to thermal degradation, are non-yellowing and/or have low coefficients of friction, with compositions directed to secondary coatings, ink coatings, bundling materials, and matrix materials being preferred.

The above objectives and other objectives are obtained by the following. It has now been found that the urethane and polyether linkages commonly used in inner primary coatings, outer primary coatings, colored outer primary coatings, ink coatings, and matrix materials are susceptible to thermal degradation if present in large amounts. The present invention provides radiation-curable compositions with low, or substantially no urethane and polyether linkages to provide optical fiber coatings and matrix materials having enhanced resistance to thermal degradation. The radiation-curable compositions according to the present invention provide coatings and matrix materials having excellent outdoor durability, resistance to discoloration, and excellent mechanical properties.

The present invention provides a novel radiation-curable, optical fiber coating composition having enhanced color stabilization when suitably cured. The radiation-curable, optical fiber coating composition is formulated from a composition including at least one radiation-curable oligomer containing a backbone formulated from monomers including acrylic acid, methacrylic acid, or a mixture thereof, and at least one radiation-curable functional group bound to the backbone, the oligomer having a number average molecular weight of from about 500 to about 200,000, wherein the urethane concentration in the composition is less than 5% by weight, based on the total weight of the composition.

The present invention also provides a novel radiation-curable composition which is formulated from a composition including at least one radiation-curable oligomer or monomer, wherein a concentration of urethane and ether linkages in the radiation-curable composition is such that a cured optical fiber coating formed from the radiation-curable composition exhibits a ΔE of about 40 or less after being exposed to 96 hours at 150° C. and then 144 hours at 180° C.

The present invention further provides a novel radiation-curable optical fiber coating composition having a low coefficient of friction without the use of slip additives when suitably cured including the following combination of pre-mixture ingredients:

(A) between about 10 wt. % and about 95 wt. % of at least one radiation-curable oligomer comprising an acrylic backbone and at least one radiation-curable acrylate group, wherein the oligomer is substantially urethane-free;

(B) between about 5 wt. % to about 95 wt. % of one or more monomer diluents;

(C) optionally, an effective amount of at least one photopolymerization initiator.

The present invention provides a radiation-curable composition for fiber optic materials comprising the following combination of pre-mixture ingredients:

at least two radiation-curable compounds, wherein at least one of the compounds is a radiation-curable oligomer comprising at least one acrylate group and an acrylic oligomeric backbone, the compounds being substantially urethane-free, optionally, at least one photoinitiator, wherein the amounts of the pre-mixture ingredients are effective to provide the radiation-curable composition with a viscosity of about 1,000 cps to about 10,000 cps.

The present invention also provides a novel coated optical fiber comprising:

an optical fiber;

at least one coating on the optical fiber having enhanced resistance to thermal degradation. The coating has a concentration of urethane and ether linkages that provides a ΔE of about 40 or less after being exposed for 96 hours to 150° C. and then for 144 hours to 180° C.

The present invention also provides a novel radiation-curable, matrix forming composition having enhanced color stabilization when suitably cured. The composition is formulated from a composition comprising at least one radiation-curable oligomer or monomer. A concentration of urethane and ether linkages in the radiation-curable composition is such that a cured matrix material formed from the radiation-curable composition exhibits a ΔE of about 40 or less after being exposed for 96 hours to 150° C. and then for 144 hours to 180° C.

The present invention further provides a novel ribbon assembly comprising:

a plurality of optical fibers;

a matrix material binding the plurality of coated optical fibers together and having enhanced resistance to degradation caused by heat. The matrix material has a concentration of urethane and ether linkages that provides a ΔE of about 40 or less after being exposed for 96 hours to 150° C. and then for 144 hours to 180° C.

BRIEF DESCRIPTION OF THE FIGURE

The FIGURE illustrates a graph of ΔE versus Time at elevated temperature for Examples 1–2 and Comparative Example A.

DETAILED DESCRIPTION OF PREFERRED EMBODIMENTS

It has now been found that urethane linkages and ether linkages present in optical fiber coatings and matrix materials can substantially degrade over time upon exposure to heat, resulting in undesirable properties. For example, degradation of the urethane and/or ether linkages can lead to unwanted yellowing of the optical fiber coating. Yellowing of the coating on optical fibers used in ribbon assemblies can lead to misidentification of the individually color-coded optical fibers. Furthermore, degradation of the urethane and/or ether linkages in the optical fiber coating can even lead to a loss of coating integrity, resulting in cracking, flaking, or peeling of the coating. When such a loss of integrity occurs, the coating is no longer able to protect the delicate optical fiber from the environment, which can lead to attenuation of the signal transmission.

Radiation-curable optical fiber coating compositions and radiation-curable matrix compositions are now well known in the art. Such radiation-curable compositions usually contain at least one radiation-curable oligomer or monomer, as well as reactive diluents, photoinitiators, and additives. The term "radiation-curable composition" hereinafter will be understood to refer to both radiation-curable, optical fiber coating compositions (such as, for forming inner primary coatings, outer primary coatings, colored secondary coatings, ink coatings, bundling materials, ribbon matrix materials and colored matrix materials on optical fibers, unless otherwise stated.

For this invention, "pre-mixture ingredient" means an ingredient before it is mixed with other ingredients. When formulating a radiation-curable composition from its ingredients, some interaction or reaction of the ingredients is possible after mixing. The present invention is not generally limited by the order in which the pre-mixture ingredients are mixed. In many cases, for example, monomer diluent will be present as a solvent during oligomer preparation and will be further incorporated into the compositions after oligomer preparation. Also, oligomers can be purchased as mixtures of oligomer and monomer diluent.

"(Meth)acrylate" refers to acrylate, methacrylate, or a mixture thereof. The term "(meth)acrylic" refers to acrylic, methacrylic, or a mixture thereof. "Urethane-free" means urethane linkage are not present in the composition.

It has been found by extensive experimentation that as the concentration of urethane linkages and ether linkages present in the radiation-curable composition is decreased, the resistance of the cured optical fiber coating or matrix material to thermal degradation is substantially increased. The terms "urethane concentration" and "ether concentration" represent the weight percentage of all urethane linkages or ether linkages present in the radiation-curable composition, relative to the total weight of the radiation-curable composition. Based on this discovery, the urethane concentration and/or ether concentration should be adjusted to a lower level which provides an optical fiber coating or matrix material having the desired resistance to thermal degradation. In particular, the urethane concentration and/or ether concentration can be adjusted to a lower level which provides a cured optical fiber coating or matrix material having a ΔE value of 3 or less, preferably a ΔE value of about 2 or less, and most preferably a ΔE value of about 1 or less when exposed for 96 hours to 1 50° C. The urethane concentration and/or ether concentration can also be adjusted to a lower level which provides a cured optical fiber coating or matrix material having a ΔE value of about 40 or less, preferably a ΔE value of about 30 or less, more preferably a ΔE value of about 20 or less, and most preferably a ΔE value of about 10 or less, when exposed for 96 hours to 150° C. and then 144 hours to 180° C.

Suitable urethane concentrations have been found to be less than about 5% by weight, preferably about 3% by weight or less, more preferably about 1% by weight or less, and most preferably substantially 0% by weight, based on the total weight of the radiation-curable coating composition. Suitable ether concentrations have been found to be about 15% by weight or less, preferably about 10% by weight or less, and most preferably about 6% by weight or less, based on the total weight of the radiation-curable coating composition. The urethane concentration is based on the amount of urethane linkage and the ether concentration is based on the amount of ether linkage in the radiation-curable composition.

The improved radiation-curable compositions according to the present invention can be based on known radiation-curable compositions, which contain radiation-curable monomers and oligomers. The known radiation-curable compositions can only become the improved radiation-curable compositions according to the present invention by reducing the urethane and/or ether concentration, such as by replacing the radiation-curable, polyurethane and/or polyether, oligomer(s) and monomer(s) used in known radiation-curable compositions with radiation-curable oligomer(s) and monomer(s) having reduced quantities of urethane and/or ether linkages. Examples of suitable radiation-curable compositions that can be reformulated according to the present invention include those variously disclosed in U.S. Pat. Nos. 4,624,994; 4,682,851; 4,782,129; 4,794,133; 4,806,574; 4,849,462; 5,219,896; and 5,336,563, all of which are incorporated herein by reference.

In a first embodiment of the present invention, the compositions are urethane-free with a low coefficient of friction after curing without a slip additive. In a second embodiment of the present invention also with low coefficient of friction without a slip additive, the compositions include some urethane linkage, and preferably, some urethane linkage in the oligomer. In a third embodiment of the present invention, the compositions are urethane-free and have improved thermal stability and non-yellowing characteristics.

Compositions according to the present invention can be formulated from (A) an oligomer system, (B) a monomer or reactive diluent system, (C) an optional photoinitiator system, and (D) additives.

(A) Radiation-Curable Oligomer

Radiation-curable oligomers suitable for use in the present invention contain one or more radiation-curable functional groups. The radiation-curable functional groups can be any functional group capable of polymerization when exposed to actinic radiation. Usually, the radiation-curable functionality is ethylenic unsaturation, which can be polymerized through radical polymerization or cationic polymerization. Specific examples of suitable ethylenic unsaturation are groups containing acrylate, methacrylate, styrene, vinyl, vinylether, vinyl ester, N-substituted acrylamide, N-vinyl amide, maleate esters, and fumarate esters. Preferably, the ethylenic unsaturation is provided by a group containing at least one acrylate, methacrylate, or N-vinyl functionality.

Another type of functionality generally used is provided by, for example, epoxy groups, or thiol-ene or amine-ene systems. Epoxy groups can be polymerized through cationic polymerization, whereas the thiol-ene and amine-ene systems are usually polymerized through radical polymerization. The epoxy groups can be, for example, homopolymerized. In the thiol-ene and amine-ene systems, for example, polymerization can occur between a group containing allylic unsaturation and a group containing a tertiary amine or thiol.

Preferably, at least about 80 mole %, more preferably, at least about 90 mole %, and most preferably substantially all of the radiation-curable functional groups present in the oligomer are acrylate, methacrylate or N-vinyl functionalities.

The radiation-curable oligomers usually comprise a carbon containing backbone to which the radiation-curable functional group(s) is bound. Examples of suitable carbon-containing backbones include polyolefins, polyesters, polyamides, and polycarbonates. The size of the carbon-containing backbone can be selected to provide the desired molecular weight. The number average molecular weight of the oligomer is usually between about 500 g/mol to about 200,000 g/mol, preferably between about 700 g/mol to about 100,000 g/mol, and more preferably between about 1,000 g/mol to about 5,000 g/mol. Number average molecular weight can be determined by gel permeation chromatography. The average functionality (number of radiation-curable functional groups) of the oligomer is usually at least about 1.0, preferably at least about 1.8, and generally lower than about 20, preferably lower than about 15.

The invention is not limited by how the oligomer is prepared. Oligomer synthetic routes can, for example, involve an esterification of a hydroxyl-functional acrylic oligomer with (meth)acrylic acid, or the reaction of an epoxy-functional acrylic oligomer with (meth)acrylic acid.

The radiation-curable oligomer is preferably formed by reacting a polymer containing an epoxy group with at least one of acrylic acid or methacrylic acid. The polymer residue after the reaction is the carbon-containing backbone to which either an acrylate or methacrylate is bound. The general reaction of epoxy groups with acrylic acid and methacrylic acid is well known and therefore one skilled in the art will easily be able to form the desired radiation-curable oligomer based on the disclosure provided herein.

The radiation-curable oligomer can also be formed by reacting a polymer containing a hydroxyl group with a compound containing a carboxylic acid and a radiation-curable functional group, or a polymer containing a carboxylic acid with a compound containing a radiation-curable functional group and a hydroxyl group, to form an ester linkage between the radiation-curable functional group and the polymer. The residue of the polymer after the reaction is the carbon-containing backbone. The reaction of carboxylic acid functional groups with hydroxyl groups to form ester linkages is well known in the art. Thus, one skilled in the art will be able to make the desired oligomer according to the present invention based on the disclosure provided herein. This method for making the oligomer is not preferred because water is formed in the reaction, which must be scavenged.

Acrylic monomers which can be used to prepare the acrylic oligomer can be represented as the esters represented in formula (1),

$$CH_2=CHCOOR \quad (1)$$

In formula (1), the acrylic monomers can be various types of esters including, for example, n-alkyl esters, secondary and branched-chain alkyl esters, esters of olefinic alcohols, aminoalkyl esters, esters of ether alcohols, cycloalkyl esters, and esters of halogenated alcohols, glycol diacrylates, vinyl acetates and styrenes. In particular, these monomers may include compounds with vinyl groups, such as styrene, vinyl acetate and acrylonitrile.

Methacrylic monomers, $CH_2=C(CH_3)COOR$, which are analogous to those of the acrylic monomers in formula (1) can also be used. In general, monomers represented as $CH_2=CR_1COOR$ can be used wherein $R_1$ is a $C_1-C_6$ alkyl.

N-alkyl esters in formula (1) include R being methyl, ethyl, propyl, butyl, pentyl, hexyl, heptyl, octyl, nonyl, decyl, dodecyl, tetradecyl, hexadecyl;

secondary and branched-chain alkyl esters in formula (1) include R being isopropyl, isobutyl, sec-butyl, 2-ethylbutyl, 2-ethylhexyl;

esters of olefinic alcohols in formula (1) include R being allyl, 2-methylallyl, furfuryl, 2-butenyl;

aminoalkyl esters in formula (1) include R being 2-(dimethylamino)ethyl, 2-(diethylamino)ethyl, 2-(dibutylamino)ethyl, and 3-(diethylamino)propyl;

esters of ether alcohols include R being 2-methoxyethyl, 2-ethoxyethyl, tetrahydrofurfuryl, 2-butoxyethyl;

cycloalkyl esters include R being cyclohexyl, 4-methylcyclohexyl, 3,3,5-trimethylcyclohexyl;

esters of halogenated alcohols include R being 2-bromoethyl, 2-chloroethyl, 2,3-dibromopropyl;

esters of glycol diacrylates include R being ethylene glycol (monoester), ethylene glycol, propylene glycol, 1,3-propanediol, 1,4-butanediol, diethylene glycol, 1,5-pentane diol, triethylene glycol, dipropylene glycol, 2,5-hexanediol, 2,2-diethyl-1,3-propanediol, 2-ethyl-1,3-hexanediol, and 1,10-decanediol.

Additional (meth)acrylic acid and ester polymers are disclosed in, for example, *Encyclopedia of Polymer Science & Engineering*, Vol. 1, pgs. 211–305, (John Wiley & Sons, 1985), the complete disclosure of which is hereby incorporated by reference.

Acrylated acrylics can be prepared by conventional synthetic methods including, for example, (1) partial esterification of acrylic polymers having pendant carboxylic acid groups with hydroxyethyl acrylate or glycidyl methacrylate, or in the alternative, acrylation of glycidyl methacrylate terpolymer with acrylic acid, or (2) polymerization of monomers which already have acrylate groups such as, for example, allyl methacrylate or N,N-dimethylaminoethyl methacrylate.

The Tg of the oligomer can be lowered by decreasing the content of methyl methacrylate.

If desired, the radiation-curable oligomer can also be easily formed by reacting (1) a polymer containing an amine, (2) a compound containing a radiation-curable functional group and an amine, and a (3) polyisocyanate. The general reaction of isocyanate functional groups with amine groups to form urea linkages is well known in the art. Thus, one skilled in the art will be able to make the improved oligomer according to the present invention based on the disclosure provided herein.

The carbon-containing backbone can also comprise hydrocarbon polymeric blocks which are connected via linking groups. Examples of oligomer containing such a hydrocarbon backbone can be represented by the following formula (2):

$$R-L-(P-L)_n-R \qquad (2)$$

where R is a radiation-curable functional group, P1 is a hydrocarbon, for example, having from about 10 to about 350 carbon atoms, preferably from about 100 to about 250 carbon atoms;

L is a linking group, and n is a positive integer, such as, from 1 to about 30, preferably from 1 to about 20.

Preferably, the oligomer is substantially free of fluorine and silicon.

Examples of suitable linking groups include alkoxy or ring opened epoxy such as ethoxy, propoxy, butoxy, and repeat units thereof. L can also be an ester, carbonate, amide, imide, or urea linking group. While not preferred, L can be an ether group or urethane group in quantities less than 5% by weight of the total composition. However, the oligomer should not contain a polyether having more than about 10 ether groups.

The invention is not limited to the oligomers represented by formula (2). For example, the oligomer may be branched and may contain one or more radiation-curable functional groups R.

Examples of commercially available acrylated acrylic oligomers include CELRAD 1700 and NOVACURE 1701 (Interez Inc.). Preferred examples of acrylated acrylic oligomers include those which can be purchased from Sartomer Co., including PRO 971; PRO 1494, which is a fluoromodified acrylated acrylic; and PRO-1735, which is a lauryl modified acrylated acrylic.

The oligomer can include at least one oligomer that contains a backbone of polyether, polyester, polycarbonate, hydrocarbon, urethane acrylate or mixtures thereof. The polyether content should be limited to not more than about 15%.

The amount of the radiation-curable oligomer (A) can be, for example, about 5 wt. % to about 95 wt. %, and preferably, about 10 wt. % to about 80 wt. %, and more preferably, about 20 wt. % to about 60 wt. %. One or more oligomers can be used.

Preferably, a mixture of ethylenically-unsaturated monomers is used to provide a copolymer backbone. By using mixtures of different monomers, the properties of the cured coating formed from the radiation-curable composition can be easily tailored. For example, acrylic polymers tend to form soft and tacky coatings, whereas methacrylic polymers tend to form hard and brittle coatings. Thus, by using different combinations of acrylic and methacrylic monomers, copolymers can be formed which provide coatings having varying hardness and flexibility. In this manner, the radiation-curable composition can be easily tailored for forming outer primary coatings, colored secondary coatings, ink coatings, bundling materials, ribbon matrix materials and colored matrix materials having the desired hardness and flexibility properties.

Examples of suitable ethylenically unsaturated functional groups for forming the vinyl-addition polymer are groups containing acrylate, methacrylate, styrene, vinylether, vinyl ester, N-substituted acrylamide, N-vinyl amide, maleate esters, and fumarate esters. Preferably, the ethylenic unsaturation is provided by a group containing acrylate, methacrylate, or N-vinyl functionality.

Examples of suitable ethylenically-unsaturated monomers include: methyl (meth)acrylate, 2-ethylhexyl (meth) acrylate, n-butyl (meth)acrylate, i-butyl (meth)acrylate, ethyl (meth)acrylate, vinyl acetate, vinyl versatate, N-isobutoxymethyl acrylamide, N-methylol acrylamide, (meth)acrylic acid, itaconic acid, and styrene. Acrylic acid and methacrylic acid are preferred.

Preferably, the ethylenically-unsaturated monomer also contains at least one functional group which can be used to attach a radiation-curable functional group to the formed copolymer backbone. Examples of suitable functional groups for attaching a radiation-curable functional group include hydroxyl, amino, and epoxy. One skilled in the art will be able to attach a radiation-curable functional group to the vinyl-addition copolymer using these functional groups. For example, if an ethylenically-unsaturated monomer containing an amine group is used, the resulting vinyl-addition polymer will contain the amine group. A compound containing a radiation-curable functional group and an isocyanate group can be reacted with the amine group to form a urea linkage between the radiation-curable functional group and the vinyl-addition polymer.

As another example, if an ethylenically-unsaturated monomer containing a hydroxyl group is used, the resulting vinyl-addition polymer will contain the hydroxyl group. A compound containing a radiation-curable functional group and a carboxylic acid group can be reacted with the hydroxyl group to form an ester linkage between the radiation-curable functional group and the vinyl-addition polymer. However, this type of reaction is not preferred because water is formed which must be scavenged.

As a further example, if an ethylenically-unsaturated monomer containing an epoxide group is used, the resulting vinyl-addition polymer will contain the epoxide group. Acrylic acid or methacrylic acid can be reacted with the epoxide group to form an ester linkage between the radiation-curable functional group, acrylate or methacrylate in this case, and the vinyl-addition polymer. This type of reaction is the preferred method for forming the radiation-curable, vinyl-addition copolymer.

Examples of suitable hydroxy-functional ethylenically-unsaturated monomers include: hydroxyethyl (meth) acrylate, hydroxypropyl (meth)acrylate, hydroxybutyl (meth)acrylate, and hydroxy terminated (meth)acrylate prepolymers such as "TONE™" prepolymers, available from Union Carbide.

Examples of suitable amine-functional ethylenically-unsaturated monomers include, for example the adduct of trimethylolpropane, isophoronediisocyanate and di(m) ethylethanolamine, the adduct of hexanediol, isophoronediisocyanate and dipropylethanolamine, and the adduct of trimethylolpropane, trimethylhexamethylenediisocyanate, trimethylhexamethylenediisocyanate and di(m) ethylethanolamine.

Examples of suitable epoxy-functional ethylenically-unsaturated monomers include, for example glycidyl (meth) acrylate, epoxy-cyclohexane, phenylepoxyethane, 1,2-epoxy-4-vinylcyclohexane, 1,2-epoxy-4-epoxyethyl-cyclohexane, the diglycidylether of polyethylene-glycol, and the diglycidylether of bisphenol-A, and the like.

A thermal initiator can be added to enhance the co-polymerization reaction between the ethylenically-unsaturated monomer(s). Thermal initiators are well known and one skilled in the art will easily know how to select and use them, based on the disclosure herein. Examples of suitable thermal initiators include:

t-butylperoxy 2-ethylhexanoate,
t-butylperoxy benzoate,
t-butylperoxy pivalate,
t-amylperoxy 2-ethylhexanoate,
t-amylperbenzoate,
t-amylperpivalate, and
azo compounds such as azobisisobutyronitrile.

(B) Monomer Diluent

The compositions according to the invention also comprise a monomer or reactive diluent system which comprises at least one monomer diluent. The reactive diluent can be used to adjust the viscosity of the coating composition. Usually, the viscosity of the low viscosity diluent monomer is from about 5 to about 500 mPa.s at 25° C. Examples of suitable viscosities for optical fiber coating compositions range from about 500 to about 50,000 mPa.s at 25° C. Examples of suitable viscosities for optical fiber coating compositions that are suitable for application on optical fiber drawing towers range from about 1,000 to about 25,000, preferably about 2,500 to about 11,000 mPa.s at 25° C. The reactive diluent can be a low viscosity monomer having at least one functional group capable of polymerization when exposed to actinic radiation. This functional group may be of the same kind as that used in the radiation-curable monomer or oligomer. Preferably, the functional group present in the reactive diluent is capable of copolymerizing with the radiation-curable functional group present on the radiation-curable monomer or oligomer.

Ethylenic unsaturation is preferred. In particular, acrylate unsaturation is preferred.

Suitable amounts of the reactive diluent have been found to be about 1 wt. % to about 80 wt. %, and more preferably about 2 wt. % to about 60 wt. %, and more preferably, about 3 wt. % to about 50 wt. %.

For example, the reactive diluent can be a monomer or mixture of monomers having an acrylate or vinyl ether functionality and a $C_4$–$C_{20}$ alkyl or polyether moiety. Particular examples of such reactive diluents include:

hexyl (meth)acrylate,
2-ethylhexyl (meth)acrylate,
isobornyl (meth)acrylate,
decyl (meth)acrylate,
lauryl (meth)acrylate,
stearyl (meth) acrylate,
2-(2-ethoxyethoxy)ethyl (meth)acrylate,
laurylvinylether,
2-ethylhexylvinyl ether,
N-vinyl formamide,
isodecyl (meth)acrylate,
isooctyl (meth)acrylate,
N-vinyl pyrrolidone,
N-vinyl caprolactam,
N-isobutoxymethyl acrylamide
and the like.

Another type of reactive diluent that can be used is a compound having an aromatic group. Particular examples of reactive diluents having an aromatic group include:

phenoxyethyl (meth)acrylate
ethyleneglycolphenylether (meth)acrylate;
polyethyleneglycolphenylether (meth)acrylate;
polypropyleneglycolphenylether (meth)acrylate; and
alkyl-substituted phenyl derivatives of the above monomers, such as polyethyleneglycolnonylphenylether (meth)acrylate.

The reactive diluent can also comprise a diluent having two or more functional groups capable of polymerization. Particular examples of such monomers include:

bisphenol A diacrylate
dicyclohexane dimethanol diacrylate
$C_2$–$C_{18}$ hydrocarbon-diol di(meth)acrylates,
$C_4$–$C_{18}$ hydrocarbondivinylethers,
$C_3$–$C_{18}$ hydrocarbon triol tri(meth)acrylates, and the polyether analogs thereof, and the like,
such as
1,6-hexanediol di(meth)acrylate,
trimethylolpropane tri(meth)acrylate,
hexanedioldivinylether,
triethylene-glycol di(meth)acrylate,
pentaerythritol tri(meth)acrylate,
alkoxylated bisphenol-A di(meth)acrylate, and
tripropyleneglycol di(meth)acrylate.

If the radiation-curable functional group of the radiation-curable monomer or oligomer is an epoxy group, for example, one or more of the following compounds can be used as the reactive diluent:

epoxy-cyclohexane,
phenylepoxyethane,
1,2-epoxy-4-vinylcyclohexane,
glycidyl (meth)acrylate,
1,2-epoxy-4-epoxyethyl-cyclohexane,
diglycidylether of polyethylene-glycol,
diglycidylether of bisphenol-A,
and the like.

If the radiation-curable functional group of the radiation-curable monomer or oligomer has an amine-ene or thiol-ene system, examples of reactive diluents having allylic unsaturation that can be used include:

diallylphthalate,
triallyltri-mellitate,
triallylcyanurate,
triallylisocyanurate, and
diallylisophthalate.

For amine-ene systems, amine functional diluents that can be used include, for example: the adduct of trimethylolpropane, isophoronediisocyanate and di(m)ethylethanolamine; the adduct of hexanediol, isophoronediisocyanate and dipropylethanolamine; and the adduct of trimethylol propane, tri-methylhexamethylenediisocyanate and di(m)ethylethanolamine.

(C) Optional Photoinitiator

The composition may optionally further comprise at least one photoinitiator. A photoinitiator is required for a fast UV cure but may be omitted for electron beam cure. Conventional photoinitiators can be used. Examples include benzophenones, acetophenone derivatives, such as alpha-hydroxyalkylphenylketones, benzoin alkyl ethers and benzil ketals, monoacylphosphine oxides, and bisacylphosphine oxides.

Often mixtures of photoinitiators provide a suitable balance of properties.

Preferred photoinitiators include IRGACURE 184 (available from Ciba Geigy) and LUCIRIN TPO (commercially available from BASF) and mixtures thereof.

The amount of photoinitiator system is not particularly limited but will be effective to provide fast cure speed, ready processability, reasonable cost, good surface and through cure, and lack of yellowing upon aging. Typical amounts can be, for example, about 0.3 wt. % to about 30 wt. % and, preferably, about 1 wt. % to about 5 wt. %.

The coating compositions of the invention may comprise a photoinitiator-free system, such as an acrylate functional resin and an aliphatic maleimide, which can suitably undergo UV cure without the aid of a conventional photoinitiator. Such radiation curable compositions may include one or more reactive unsaturated species connected to an electron donating group, optionally combined with an allyl group-containing compound connected to an electron-donating group. The unsaturated species may include members of the group consisting of acrylates, methacrylates, fumarates, maleates, itaconates, citraconates, mesaconates, and their derivatives, such as fumaric amides, fumaric amide esters and maleamide esters. Other esters, urethanes, urea, thiourethane and anhydrides may also be suitable. The reactive unsaturated species may also be a vinyl ether, a vinyl ester, a vinyl amide, a vinyl amine, a vinyl thioether, an allyl amine or an allyl amide. Vinyl ether maleimides and maleimides with acrylates are preferred. Preferably, acrylates are combined with cyclohexyl maleimides to form a system capable of radical cure. See Conference Proceedings, Radtech Europe, (June, 1997), the entire contents of which are hereby incorporated herein by reference.

(D) Additives

A major advantage of one embodiment of the present invention is that slip additives can be substantially or completely avoided. If slip additives are present, they are preferably used in amounts less than about 0.5 wt. %, and more preferably, less than about 0.25 wt. %, and more preferably, less than about 0.1 wt. %.

Other additives include UV absorbers, particulates, colorants including dyes and pigments, dispersion aides, antioxidants, organofunctional silane compounds, light stabilizers including hindered amine light stabilizers, photopolymerization synergists, catalysts, and the like. One skilled in the art will easily be able to make and use such a composition without undue experimentation based on the disclosure presented herein.

Preferably, one embodiment of the present invention is substantially free of additives which are known to cause yellowing. Examples of such additives include amines.

The compositions of the present invention may include acrylate acrylics with urethanes up to the extent that they do not adversely affect the advantages provided by the compositions of this invention. Preferably, the total composition will comprise less than 5 wt. % of urethane linkages which includes the urethane linkages present in any acrylate acrylics.

The formulations of the present invention can be adapted to be inner primary coatings, outer primary coatings, colored outer primary coatings, inks, matrix materials, colored matrix materials, bundling materials, adhesives, and upjacketting coatings, and other fiber optic materials. Outer primary coatings, particularly colored outer primary coatings, matrix materials and colored matrix materials are particularly preferred embodiments of the present invention.

If the radiation-curable composition of the present invention is to be used to form an inner primary coating, the composition preferably contains an effective amount of a glass adhesion promoting compound. Such amounts have been found to be from about 0.1 to about 30% by weight, based on the total weight of the composition. Examples of suitable glass adhesion promoting agents include γ-mercaptopropyl trimethoxysilane or (meth) acryloxyalkyltrimethoxysilane.

A suitable radiation-curable composition includes the following pre-mixture ingredients:
from about 10 wt. % to about 90 wt. % of a radiation-curable oligomer including an acrylic backbone and at least one radiation-curable group, wherein the oligomer is urethane-free;
from about 5 wt. % to about 90 wt. % of one or more monomer diluents; and
optionally, an effective amount of at least one photopolymerization initiator.

Another embodiment of the present invention is a suitable radiation-curable composition which includes:
from about 5 to about 90% by weight of at least one radiation-curable oligomer or monomer;
from about 0.01 to about 30% by weight of at least one photoinitiator; and
optionally from about 1 to about 70% by weight of at least one low viscosity reactive diluent, wherein the urethane concentration is about 1% by weight or less and the ether concentration is about 1% by weight or less, based on the total weight of the radiation-curable composition.

A preferred radiation-curable, optical fiber coating composition includes:
from about 10 to about 80% by weight of at least one radiation-curable oligomer including a vinyl-addition polymer to which at least one acrylate or methacrylate group is bound and having a number-average molecular weight of about 1,000 to about 200,000;
from about 0.01 to about 30% by weight of at least one photoinitiator; and
optionally from about 1 to about 70% by weight of at least one low viscosity reactive diluent, wherein the urethane concentration is about 1% by weight or less and the ether concentration is about 1% by weight or less, based on the total weight of the radiation-curable composition.

A preferred radiation-curable ink coating composition includes:
from about 10 to about 80% by weight of at least one radiation-curable oligomer including a vinyl-addition polymer to which at least one acrylate or methacrylate group is bound and having a number average molecular weight of about 1,000 to about 200,000;
from about 0.01 to about 20% by weight of at least one photoinitiator;
from about 1 to about 30% by weight of at least one pigment; and
optionally from about 1 to about 70% by weight of at least one low viscosity reactive diluent, wherein the urethane concentration is about 1% by weight or less and the ether concentration is about 1% by weight or less, based on the total weight of the radiation-curable composition.

A preferred radiation-curable, matrix forming composition includes:
from about 10 to about 80% by weight of at least one radiation-curable oligomer including a vinyl-addition polymer to which at least one acrylate or methacrylate group is bound and having a number average molecular weight of about 1,000 to about 200,000;
from about 0.01 to about 20% by weight of at least one photoinitiator; and
optionally from about 1 to about 70% by weight of at least one low viscosity reactive diluent, wherein the urethane concentration is about 1% by weight or less and the ether concentration is about 1% by weight or less, based on the total weight of the radiation-curable composition.

Preferably, the compositions contain from about 10 to about 60% by weight and more preferably from about 10 to about 50% by weight of the low viscosity diluent(s).

Preferably, the radiation-curable oligomer(s) is present in an amount of about 10 to about 60% by weight, more preferably, from about 10 to about 40% by weight. The radiation-curable oligomer(s) preferably comprises a vinyl-addition copolymer formed mainly from acrylic and methacrylic acid which is substantially free of fluorine and silicon.

The radiation-curable compositions can be used to form coatings on optical fibers. The improved coatings formed on the optical fibers exhibit enhanced resistance to thermal degradation. The coated optical fibers are useful in telecommunications systems and cable television systems.

In producing a coated optical fiber, the liquid radiation-curable composition can be applied to the optical fiber and subsequently cured. Typically, the cure is affected using actinic radiation, such as ultraviolet or visible radiation. However, other methods are available. For example, the coating can be cured by electron beam irradiation, where no catalyst is required. More than one coating according to the present invention can be applied. In many applications involving optical fibers it is desirable to have an outermost layer (outer primary coating) that is tough or hard enough to protect the optical fiber and underlying coatings, including the inner primary coating. The underlying coatings and inner primary coating are typically softer in comparison to the outermost coating. Surprisingly, it was found that with the compositions according to the present invention, one can provide both an outer primary coating having good strength properties and an inner primary coating having the required properties for preventing microbending in the optical fiber. In particular, the radiation-curable coating compositions according to the present invention provide coatings having excellent outdoor durability, resistance to discoloration, in combination with excellent mechanical properties.

In particular, inner primary coatings according to the present invention possess a modulus and glass transition temperature suitable for protecting the optical fiber from microbending. For example, the inner primary coatings possess a modulus of about 10 MPa or less, preferably about 7 MPa or less, more preferably between 0.01 to 5 MPa, and glass transition temperature of about $-20°$ C. or less, preferably about $-30°$ C. or less.

Outer primary coatings according to the present invention possess a modulus and glass transition temperature suitable for protecting the inner primary coating and optical fiber. For example, the outer primary coatings possess a modulus of greater than 10 MPa, preferably greater than 50 MPa to about 2000 MPa and more preferably about 500 MPa to about 1500 MPa and/or a glass transition temperature of about $40°$ C. or greater, more preferably $50°$ C. to $140°$ C.

Because of the useful properties obtainable with the coating compositions according to the present invention, in a coated optical fiber including an inner primary coating, an outer primary coating, a colored outer primary coating and an ink coating, it is part of this invention to have either the inner primary coating, or the outer primary coating, particularly if the outer primary coating is colored, or the ink coating, or any combination thereof, being a cured composition according to the present invention.

Ribbon assemblies are now well known in the art and one skilled in the art will easily be able to use the disclosure provided herein to prepare a novel ribbon assembly containing coated optical fibers for the desired applications. The ribbon assembly containing the improved matrix material or colored matrix material according to the present invention exhibits enhanced resistance to thermal degradation. The ribbon assemblies preferably contain at least one coated optical fiber having at least one improved coating according to the present invention. The novel ribbon assembly made according to this invention are suitable for use in telecommunication systems. Such telecommunication systems typically include ribbon assemblies containing optical fibers, transmitters, receivers, and switches. The ribbon assembly containing the coated optical fibers are the fundamental connecting units of telecommunication systems. The ribbon assembly can be buried under ground or water for long distance connections, such as between cities. The ribbon assembly can also be used to connect directly to residential homes.

The novel ribbon assembly made according to this invention are also suitable for use in cable television systems. Such cable television systems typically include ribbon assemblies containing optical fibers, transmitters, receivers, and switches. The ribbon assembly containing the coated optical fibers are the fundamental connecting units of such cable television systems. The ribbon assembly can be buried under ground or water for long distance connections, such as between cities. The ribbon assembly can also be used to connect directly to residential homes.

Cure speed for these compositions is preferably less than about 1.0 $J/cm^2$, and preferably is less than about 0.8 $J/cm^2$, wherein cure speed is the dose at which a 95% attainment of the maximum modulus is achieved.

The compositions preferably will have good clarity before and after cure. Clarity can be examined with use of an optical microscope.

A particularly important property of the present compositions, after radiation-cure, is the coefficient of friction (COF). Two types of coefficient of friction which are particularly important are the film-to-stainless steel COF and the film-to-film COF. The film-to-stainless steel coefficient of friction is preferably less than 1.20, and more preferably, is less than 1.10. The film-to-film COF is preferably less than 1.1, and more preferably is less than 1.0.

In a preferred embodiment, the compositions are formulated to be an outer primary coating having a low coefficient of friction. An outer primary coating preferably will meet at least some of the following criteria:

| | |
|---|---|
| Viscosity @ $25°$ C. (mPa · s) | 3,000–10,000 |
| Elastic Modulus: E' = 1000 MPa ($°$ C.) | >$35°$ C. |
| E' = 100 MPa ($°$ C.) | >$48°$ C. |
| Secant Modulus @ $23°$ C. (MPa) | 400–1000 |
| Elongation (%) | >10 |
| Cure Speed @ 95% modulus ($J/cm^2$) | <0.3 |
| $125°$ C./30 day color change ($\Delta$E) | <20 |
| Fluorescent/30 day color change ($\Delta$E) | <20 |
| Oxidation Initiation Temp. ($°$ C.) | >225 |
| TGA wt. loss, 40 min. @ $200°$ C. (%) | <6 |
| Acetone Extractables (%) | <4 |

Conventional methods in the radiation-cure and optical fiber arts can be used to cure the compositions including electron-beam cure and UV cure. Thermal cure is less preferred, although some thermal cure may possibly occur under a hot UV lamp and with heat of polymerization. UV cure is preferred. Electron beam cure provides the advantage that photoinitiators may be omitted.

In general, exposure to radiation should cause the composition to attain about 80% and more preferably, about 90% of the maximum attainable secant modulus.

Most preferably if fast cure speed is desired, the radiation-curable group is an acrylate.

The invention will be further illustrated with use of the following non-limiting examples.

EXAMPLES 1–6 AND COMPARATIVE EXAMPLE A

Six radiation-curable compositions according to the present invention were formed by combining the components shown in Table 1. A radiation-curable coating composition based on urethane oligomers was also formed for comparison. 75 micron thick drawdowns of the radiation-curable compositions were formed and suitably cured by exposure to UV light to form films.

TABLE 1

| Component (% by weight based on total weight of composition) | Ex. 1 | Ex. 2 | Ex. 3 | Ex. 4 | Ex. 5 | Ex. 6 | Comp. Ex. A |
|---|---|---|---|---|---|---|---|
| PRO 971[1] | 35.2 | 0 | 0 | 40 | 0 | 0 | 0 |
| PRO 1494[2] | 0 | 35.2 | 0 | 0 | 33 | 0 | 0 |
| PRO 1735[3] | 0 | 0 | 35.2 | 0 | 0 | 40.45 | 0 |
| Oligomer H-T-PTGL1000-T-H | 0 | 0 | 0 | 0 | 0 | 0 | 28.92 |
| Monomer H-T-H | 0 | 0 | 0 | 0 | 0 | 0 | 3.56 |
| Vinyl Caprolactam | 10 | 10 | 10 | 10 | 12 | 10.5 | 0 |
| Bisphenol A Ethoxylate Diacrylate | 15 | 15 | 15 | 10.2 | 0 | 15 | 56 |
| Phenol,4,4'-(1-Methyl-Ethylidene)Bis-, Polymer with (Chloromethyl)Oxirane, 2-Propenoate | 15 | 15 | 15 | 15 | 15 | 15 | 0 |
| Phenoxy Ethyl Acrylate | 6.75 | 6.75 | 6.75 | 6.75 | 8.55 | 0 | 0 |
| Isobornyl Acrylate | 13.8 | 13.8 | 13.8 | 13.8 | 15.2 | 14.8 | 0 |
| Ethoxylated Nonylphenol Acrylate Ester | 0 | 0 | 0 | 0 | 0 | 0 | 8 |
| Diphenyl (2,4,6-Trimethylbenzoyl) Phosphine Oxide and 2-Hydroxy-2-Methyl-1-Phenyl-1-Propanone | 1 | 1 | 1 | 1 | 1 | 1 | 1 |
| 1-Hydroxycyclohexyl Phenyl Ketone | 1.5 | 1.5 | 1.5 | 1.5 | 1.5 | 1.5 | 2 |
| Cyagard UV 416[4] (Cytec) | 0.25 | 0.25 | 0.25 | 0.25 | 0.25 | 0.25 | 0 |
| Thiodiethylene Bis(3,5-di-tertbutyl-4-Hydroxy)Hyrocinnamate | 0 | 0 | 0 | 0 | 0 | 0 | 0.5 |
| Irganox 1076 (Ciba-Geigy) | 0.5 | 0.5 | 0.5 | 0.5 | 0.5 | 0.5 | 0 |
| Cyagard AO 711[5] (Cytec) | 1 | 1 | 1 | 1 | 1 | 1 | 0 |
| Irgacure 214 (Ciba-Geigy) | 0 | 0 | 0 | 0 | 12 | 0 | 0 |

[1]PRO 971 is an urethane-free acrylated acrylic oligomer obtained from Sartomer having an epoxy value of 0.4 mg KOH/g.
[2]PRO 1494 is an urethane-free fluoromodified acrylated acrylic oligomer obtained from Sartomer having an epoxy value of 1.0 mg KOH/g.
[3]PRO 1735 is an urethane-free laurylmodified acrylated acrylic oligomer obtained from Sartomer having an epoxy value of 2.6 mg KOH/g.
[4]Cyagard UV 416 is 2-hydroxy-4-acryloxyethoxybenzophenone
[5]Cyagard AO 711 is ditridecylthiodioprionate The properties of the films, which were prepared according to Table 1, were measured and the test results are shown in Table 2.

TABLE 2

| Test Results | Ex. 1 | Ex. 2 | Ex. 3 | Ex. 4 | Ex. 5 | Ex. 6 | Comp. Ex. A |
|---|---|---|---|---|---|---|---|
| Viscosity (mPa · s)(25° C.) | 3600 | 21,500 | 2,000 | 5,300 | 10,800 | 3,900 | |
| Gardner Color | 11–12 | 4–5 | 3–4 | | | | |
| Refractive Index | 1.507 | 1.5055 | 1.506 | 1.503 | | 1.5025 | |
| Clarity | Clear | Clear | Slightly Hazy | | | | |
| Tensile Strength (MPa) | 29 | 19 | 22 | 26 | 18 | 23 | |
| Elongation (%) | 9 | 15 | 9 | 8 | 13 | 11 | |
| Modulus (MPa) | 804 | 423 | 577 | 799 | 502 | 608 | |
| E' = 1000 MPa (° C.) | 32 | 15 | 20 | 25 | 8 | 15 | |
| E' = 100 MPa (° C.) | 66 | 54 | 73 | 51 | 34 | 56 | |
| Tan* Max (° C.) | 68 | 61 | 78 | 55 | 42 | 59 | |
| $E_0$ (MPa) | 16.4 | 11.3 | 19.7 | 11.4 | 5.4 | 14.9 | |
| Dose to Achieve 95% of Maximum Attainable Modulus (J/cm$^2$) | | | | 0.53 | | 0.42 | |
| Change in Viscosity, 3 Days at 60° C. (% increase) | | | | 5.4 | | 43.4 | |
| Coefficient of Friction, film-to-film | 0.7 | | ND | 0.4 | 0.4 | 0.5 | ND |
| Coefficient of Friction, film-to-steel | 0.7 | 0.4 | 0.8 | 1.0 | 0.7 | 0.4 | |
| % Weight Loss, 96 Hours at 150° C. | 4.4 | 11.8 | 3.9 | | | | 2.9 |
| % Weight Loss, 96 Hours at 150° C., then 144 Hours at 180° C. (%) | 9 | 15.5 | 8.8 | | | | 9.5 |
| ΔE 96 Hours at 150° C. (%) | 1.1 | 0.67 | 0.8 | | | | 3.8 |
| ΔE 96 Hours at 150° C., and then 144 hours at 180° C. (%) | 11.7 | 9.4 | 13.5 | | | | 55.6 |
| Urethane Concentration (wt. %) | 0 | 0 | 0 | 0 | 0 | 0 | 5.35 |
| Total Ether Concentration of Composition (wt. %) | 6.4 | 6.4 | 6.4 | 6.4 | 6.8 | 5.2 | 23.2 |
| Ether Concentration Based on Monomers and Oligomers Having Average Number of Ether Groups 1–2 (wt. %) | 6.4 | 6.4 | 6.4 | 6.4 | 6.8 | 5.2 | 10.4* |

TABLE 2-continued

| Test Results | Ex. 1 | Ex. 2 | Ex. 3 | Ex. 4 | Ex. 5 | Ex. 6 | Comp. Ex. A |
|---|---|---|---|---|---|---|---|
| Ether Concentration Based on Monomers and Oligomers Having Average Number of Ether Groups >2–10 (wt. %) | 0 | 0 | 0 | 0 | 0 | 0 | 2.8* |
| Ether Concentration Based on Monomers and Oligomers Having Average Number of Ether Groups >10 (wt. %) | 0 | 0 | 0 | 0 | 0 | 0 | 10* |

ND = Not Determinable

The oligomers and monomers were prepared by reacting the following components: H=Hydroxyethyl Acrylate; T=Toluene Diisocyanate; and PTGL1000=1000 molecular weight polymethyltetrahydrofurfuryl/polytetrahydrofurfuryl copolymer diol, available from Mitsui, N.Y.

The results shown in Table 2 demonstrate that the present invention is capable of providing radiation-curable compositions that are suitable for application to optical fibers and which when suitably cured exhibit enhanced resistance to thermal degradation. In particular, the Examples according to the present invention exhibited a remarkably reduced ΔE compared to the Comparative Example, which demonstrates that the Examples were substantially more resistant to thermal degradation. Larger ΔE values, as well as the degree of associated color change, can negatively impact thermal degradation.

The test results also demonstrate that surprisingly the coefficient of friction (film-to-film) is less than the coefficient of friction (film-to-steel). Usually, the coefficient of friction (film-to-steel) is greater than the coefficient of friction (film-to-film). The coating compositions according to the present invention are capable of providing a coating on an optical fiber that inherently has a coefficient of friction suitable for ribbon stripping, when used in making ribbon assemblies. Thus, when the coatings according to the present invention are utilized on optical fibers in ribbon assemblies, the low inherent coefficient of friction of the coatings allows the matrix material to slide off the inked or colored secondary optical fiber during ribbon stripping.

The test results further demonstrate that the coatings according to the present invention surprisingly exhibit a high refractive index without the use of fluorinated additives or fluorine containing oligomers.

EXAMPLES 7–12

Formulations were prepared according to the following Table 3. Compositions were cured at 1.0 $J/cm^2$ under a D lamp with $N_2$ (8 cfm) for 3 mil film on glass. Properties of the cured coatings are provided below.

TABLE 3

| Components | Ex. 7 | Ex. 8 | Ex. 9 | Ex. 10 | Ex. 11 | Ex. 12 |
|---|---|---|---|---|---|---|
| PRO 971 (Sartomer) | 35.2 | | | 40.0 | | |
| PRO 1494 (Sartomer) | | 35.2 | | | 33 | |
| PRO 1735 (Sartomer) | | | 35.2 | | | 40.45 |
| vinyl caprolactam | 10 | 10 | 10 | 10 | 12 | 10.5 |
| ethoxylated bisphenol A diacrylate | 15 | 15 | 15 | 10.2 | | 15 |
| PHOTOMER 3016 (Henkel) | 15 | 15 | 15 | 15 | 15 | 15 |
| phenoxyethyl acrylate | 6.75 | 6.75 | 6.75 | 6.75 | 8.55 | |
| isobornyl acrylate | 13.8 | 13.8 | 13.8 | 13.8 | 15.2 | 14.8 |
| LUCIRIN TPO (BASF) | 1 | 1 | 1 | 1.0 | 1.0 | 1.0 |
| IRGACURE 184 (Ciba-Geigy) | 1.5 | 1.5 | 1.5 | 1.5 | 1.5 | 1.5 |
| Cyagard UV 416 (Cytec) | 0.25 | 0.25 | 0.25 | 0.25 | 0.25 | 0.25 |
| IRGANOX 1076 (Ciba-Geigy) | 0.5 | 0.5 | 0.5 | 0.5 | 0.5 | 0.5 |
| Cyagard AO 711 (Cytec) | 1 | 1 | 1 | 1.0 | 1.0 | 1.0 |
| IRR 214 (UCB Radcure Specialties) | | | | | 12 | |
| PROPERTIES | | | | | | |
| viscosity (cps) | 3,570 | 21,500 | 2,000 | 5,300 | 10,800 | 3,900 |
| tensile strength (MPa) | 29.0 | 19 | 22 | | | |
| elongation (%) | 9 | 15 | 9 | | | |
| secant modulus (MPa) | 804 | 423 | 577 | | | |
| E' = 1,000 MPa (° C.) | 31.9 | 15.0 | 20.1 | | | |
| E' = 100 MPa (° C.) | 65.6 | 53.7 | 72.5 | | | |
| tan delta max (° C.) | 68 | 60.5 | 78 | | | |
| $E_0$ (° C.) | 16.4 | 11.3 | 19.8 | | | |
| Gardner Color | 11–12 | 4–5 | 3–4 | | | |
| liquid refractive index | 1.507 | 1.5055 | 1.506 | | | |
| COF | 0.69 | | | 0.84 | 1.04 | 0.7 |

TABLE 3-continued

| Components | Ex. 7 | Ex. 8 | Ex. 9 | Ex. 10 | Ex. 11 | Ex. 12 |
|---|---|---|---|---|---|---|
| Film-to-Film COF Film-to-Stainless Steel | 0.74 | | 0.43 | 0.36 | 0.42 | 0.45 |

TEST METHODS

Viscosity Test Method

The viscosity was measured using a Physica MC10 Viscometer. The test samples were examined and if an excessive amount of bubbles was present, steps were taken to remove most of the bubbles. Not all bubbles need to be removed at this stage, because the act of sample loading introduces some bubbles.

The instrument was set up for the conventional Z3 system. Samples were loaded into a disposable aluminum cup by using a syringe to measure out 17 cc. The sample in the cup was examined for bubbles and if an excessive amount of bubbles were present, they were removed by a direct means such as centrifugation, or by allowing enough time to lapse to let the bubbles escape from the bulk of the liquid. Bubbles at the top surface of the liquid are acceptable.

The bob was gently lowered into the liquid in the measuring cup, and the cup and bob were installed in the instrument. The sample temperature was equilibrated for five minutes with a bath of circulating liquid. Then, the rotational speed was set to a desired value to produce the desired shear rate. The desired value of the shear rate is easily determined by one of ordinary skill in the art from an expected viscosity range of the sample.

The instrument panel read out a viscosity value, and if the viscosity value varied only slightly (less than 2% relative variation) for 15 seconds, the measurement was complete. If not, it is possible that the temperature had not yet reached an equilibrium value, or that the material was changing due to shearing. If the latter case, further testing at different shear rates will be needed to define the samples viscous properties. The results reported are the average viscosity values of three test samples.

Tensile Strength, Elongation and Modulus Test Method

The tensile strength, elongation and modulus of cured samples was tested using a universal testing instrument, Instron Model 4201 equipped with a personal computer and software "Series IX Materials Testing System." The load cells used were 2 and 20 pound capacity. The ASTM D638M was followed, with the following modifications.

A drawdown of each material to be tested was made on a glass plate or MYLAR film and cured using a UV processor. The cured film was conditioned at 22 to 24° C. and 50±5% relative humidity for a minimum of sixteen hours prior to testing.

A minimum of eight test specimens, having a width of 0.5±0.002 inches and a length of 5 inches, were cut from the cured film. To minimize the effects of minor sample defects, sample specimens were cut parallel to the direction in which the drawdown of the cured film was prepared. If the cured film was tacky to the touch, a small amount of talc was applied to the film surface using a cotton tipped applicator.

The test specimens were then removed from the substrate. Caution was exercised so that the test specimens were not stretched past their elastic limit during the removal from the substrate. If any noticeable change in sample length had taken place during removal from the substrate, the test specimen was discarded.

If the top surface of the film was talc coated to eliminate tackiness, then a small amount of talc was applied to the bottom surface of the test specimen after removal from the substrate.

The average film thickness of the test specimens was determined. At least five measurements of film thickness were made in the area to be tested (from top to bottom) and the average value used for calculations. If any of the measured values of film thickness deviated from the average by more than 10% relative, the test specimen was discarded. All specimens came from the same plate.

The appropriate load cell was determined by using the following equation:

$$[A \times 145] \times 0.0015 = C$$

where: A=sample's maximum expected tensile strength (MPa);

145=conversion factor from MPa to psi;

0.00015=approximate cross-sectional area (in$^2$) of test specimens; and

C=load (lbs.). A 2 pound load cell was used for materials where C=1.8 lbs. and a 20 pound load cell was used for materials where 1.8<C<18 lbs. If C>19, a higher capacity load cell was required.

The crosshead speed was set to 1.00 inch/min, and the crosshead action was set to "return at break". The crosshead was adjusted to 2.00 inches jaw separation. The air pressure for the pneumatic grips was turned on and adjusted as follows: set at approximately 20 psi(1.5 Kg/cm$^2$) for primary optical fiber coatings and other very soft coatings; set at approximately 40 psi (3 Kg/cm$^2$) for optical fiber single coats; and set at approximately 60 psi(4.5 Kg/cm$^2$) for secondary optical fiber coatings and other hard coatings. The appropriate Instron computer method was loaded for the coating to be analyzed.

After the Instron test instrument had been allowed to warm-up for fifteen minutes, it was calibrated and balanced following the manufacturer's operating procedures.

The temperature and humidity were measured just prior to measurement of the first test specimen. Specimens were analyzed only if the temperature was within 23±1.0° C. and the relative humidity was within 50±5%. The temperature was measured for each test specimen. The humidity value was measured only at the beginning and the end of testing a set of specimens from one plate.

Each test specimen was tested by suspending it in the space between the upper pneumatic grips such that the test specimen was centered laterally and hanging vertically. Only the upper grip was locked. The lower end of the test specimen was pulled gently so that it has no slack or buckling, and it was centered laterally in the space between the open lower grips. While holding the specimen in this position, the lower grip was locked.

The sample number was entered and sample dimensions into the data system, following the instructions provided by the software package.

The temperature and humidity were measured after the last test specimen from the current drawdown was tested. The calculation of tensile properties was performed automatically by the software package.

The values for tensile strength, % elongation, and (secant or segment) modulus were checked to determine whether any one of them deviated from the average enough to be an "outlier." If the modulus value was an outlier, it was discarded. If there were less than six data values for the tensile strength, then the entire data set was discarded and repeated using a new plate.

Elastic Modulus Test Method The elastic modulus (E'), the viscous modulus (E"), and the Tan δ Max (E"/E') of the examples were measured using a Rheometrics Solids Analyzer (RSA-11), equipped with: 1) a personal computer having MS-DOS 5.0 operating system and Rhios® software (Version 4.2.2 or later) loaded; 2) a liquid nitrogen controller system for low-temperature operation. The test samples were prepared by casting a film of the material, having a thickness in the range of 0.02 mm to 0.4 mm, on a glass plate. The sample film was cured using a UV processor. A specimen approximately 35 mm (1.4 inches) long and approximately 12 mm wide was cut from a defect-free region of the cured film. For soft films, which tend to have sticky surfaces, a cotton-tipped applicator was used to coat the cut specimen with talc powder.

The film thickness of the specimen was measured at five or more locations along the length. The average film thickness was calculated to ±0.001 mm. The thickness cannot vary by more than 0.01 mm over this length. Another specimen was taken if this condition was not met. The width of the specimen was measured at two or more locations and the average value calculated to ±0.1 mm.

The geometry of the sample was entered into the instrument. The length field was set at a value of 23.2 mm and the measured values of width and thickness of the sample specimen were entered into the appropriate fields.

Before conducting the temperature sweep, the test samples were dried by heating to a temperature of 80° C. in a nitrogen atmosphere for 5 minutes. The temperature sweep used included cooling the test samples to about −60° C. or about −80° C. and increasing the temperature at about 1° C./minute until the temperature reached about 60° C. to about 70° C. The test frequency used was 1.0 radian/second.

ΔE

A model 7000, Macbeth Color-Eye spectrophotometer (Kollmorgen Instruments Corp.) was used to measure the color of the test samples. ASTM D2244-93 was followed to determine the ΔE from the measured values.

Weight Loss

Test samples were made by forming 75 micron thick drawdowns of each of the different radiation-curable compositions on glass plates and then suitably curing the drawdowns to form cured films. The films were separated from the glass plate and cut into 1.5×1.5 inch sample squares. The weight of each sample was measured. The samples were then heated for 96 hours at 150° C. and then 144 hours at 180° C. The weight of the samples was measured periodically. The results reported are the average of three test samples.

Coefficient of Friction (Film-to-Film) and (Film-to-Steel)

Test samples were made by forming drawdowns of each of the different radiation-curable compositions on glass plates and then suitably curing the drawdowns to form cured films. The coefficient of friction between films was determined using an Instron Model No. 4201 as follows. One glass plate was mounted on the support table, film side up. A portion of the same film was cut to the same size as the 100 gram sled, and then mounted on the sled. The sled was placed on the film so that the film on the sled contacted the surface of the sample film mounted on the support table. A ten pound load cell was attached to the sled. The cross head speed was set to 10 inches per minute. The appropriate program for determining the coefficient of friction was loaded into the Instron. The weight of the sled, including the film attached to the sled, and the load cell weight were entered. A path for the sled was selected which avoided any film defects, such as ripples or bubbles. The sled travel was selected to be four inches.

The film-to-steel coefficient of friction was determined in the same manner as above, except that no sample film was mounted on the sled. Instead, the sled was placed on the sample film mounted on the support table with the balls of the sled contacting the sample film.

Refractive Index Determination

The procedure measures the refractive index at visible light wavelengths for cured fiber optic materials, utilizing Becke' line/immersion liquid with axial microscopic illumination at a sharply bounded wavelength. Small sections of the cured coating are placed on a microscope slide under a cover slip. These sections are immersed in one of a series of liquids of known refractive index and the resulting preparation observed through a microscope. The characteristic optical phenomenon known as the Becke' line is used to determine the extent and direction of the mismatch between the liquid and solid. Additional trials are made with other liquids from the series of known refractive indices until a match is found. See Mason, 3d Edition, 1958, John Wiley & Sons, New York, Vol. 1, chapter 11, for a detailed treatment of the subject of refractive index.

While the invention has been described in detail and with reference to specific embodiments thereof, it will be apparent to those of ordinary skill in the art that various changes and modifications can be made to the claimed invention without departing from the spirit and scope thereof.

What is claimed is:

1. A radiation-curable, optical fiber coating composition comprising:
   (a) at least one radiation-curable oligomer containing an acrylic backbone and at least one radiation-curable functional group having ethylenic unsaturation;
   (b) about 1 wt. % to about 80 wt. %, relative to the total weight of the composition, of a reactive diluent;
   wherein said oligomer contains 0–5% by weight urethane linkages, relative to the total weight of the composition; and
   wherein said composition, after cure, has
      (1) a secant modulus of greater than 50 MPa; and
      (2) a ΔE value of 3 or less when exposed for 96 hours to 150° C.

2. A radiation-curable, optical fiber coating composition according to claim 1, wherein said coating composition is formulated to provide, after cure, a coating selected from the group consisting of outer primary coatings, colored outer primary coatings, ink coatings, bundling materials, ribbon matrix materials and colored matrix materials.

3. A radiation curable, optical fiber coating composition according to claim 1, wherein at least one said oligomer contains a backbone comprising at least one member selected from the group consisting of polyether, polyester, polycarbonate, hydrocarbon, urethane acrylate and mixtures thereof.

4. A radiation-curable, optical fiber coating composition according to claim 1, wherein the concentration of urethane in said radiation-curable composition is substantially zero.

5. A radiation-curable, optical fiber coating composition according to claim 1, wherein the composition comprises ether linkages in an amount of about 15% by weight or less.

6. A radiation-curable, optical fiber coating composition according to claim 1, wherein said backbone further comprises a polyol.

7. A radiation-curable, optical fiber coating composition according to claim 1, wherein said radiation-curable functional group is connected to said backbone via an ester linking group.

8. A radiation-curable, optical fiber coating composition according to claim 1, wherein said oligomer is present in an amount of about 5 to about 90% by weight, based on total weight of said composition.

9. A radiation-curable, optical fiber coating composition according to claim 1, wherein said composition further comprises a low viscosity diluent in an amount of from about 1 to about 70% by weight, based on total weight of said composition.

10. A radiation-curable, optical fiber coating composition according to claim 1, wherein said composition provides an outer primary coating when cured.

11. A radiation-curable, optical fiber coating composition according to claim 1, wherein said composition further comprises at least one pigment.

12. A radiation-curable, optical fiber coating composition according to claim 1, wherein said radiation-curable composition has a ΔE of about 40 or less after being exposed for 96 hours at 150° C. and then 144 hours at 180° C.

13. A radiation-curable, optical fiber coating composition according to claim 1, wherein said oligomer is substantially free of silicon and fluorine.

14. A radiation-curable, optical fiber coating composition according to claim 1, wherein said composition is substantially free of fluorine-containing additives and said composition has a refractive index of at least 1.5 after suitable curing.

15. A radiation-curable, optical fiber coating composition according to claim 1, further comprising a maleimide.

16. A radiation-curable, optical fiber coating composition according to claim 1, further comprising a photopolymerization initiator.

17. A radiation-curable, optical fiber coating composition according to claim 1, wherein said composition provides a coating having a coefficient of friction, film-to-film, of about 0.5 or less, without use of release agents.

18. A radiation-curable, optical fiber coating composition according to claim 1, wherein after said coating composition is suitably cured, coefficient of friction, film-to-film, is less than coefficient of friction, film-to-steel.

19. A coated optical fiber comprising:
  (a) an optical fiber; and
  (b) at least one coating on said optical fiber formed from a radiation-curable composition comprising:
    (i) at least one radiation-curable oligomer containing an acrylic backbone and at least one radiation-curable group having ethylenic unsaturation;
    (ii) about 1 wt. % to about 80 wt. %, relative to the total weight of the composition, of reactive diluent;
    wherein said oligomer contains less than 5% by weight urethane linkages, relative to the total weight of the composition; and
    wherein said composition, after cure, has
      (1) a secant modulus of greater than 50 MPa; and
      (2) a ΔE value of 3 or less when exposed for 96 hours to 150° C.

20. A radiation-curable composition for coating fiber optic materials comprising the following combination of pre-mixture ingredients:
  (A) between about 10 wt. % and about 90 wt. % of a radiation-curable oligomer comprising an acrylic backbone and at least one radiation-curable group, wherein said oligomer is substantially urethane-free;
  (B) between about 1 wt. % to about 80 wt. % of one or more reactive diluents, relative to the total weight of the composition;
  wherein said composition, after cure, has
    (1) a secant modulus of greater than 50 MPa; and
    (2) a ΔE value of 3 or less when exposed for 96 hours to 150° C.

21. A radiation-curable, optical fiber coating composition according to claim 20, further comprising a maleimide.

22. A radiation-curable, optical fiber coating composition according to claim 20, further comprising a photopolymerization initiator.

23. A radiation-curable composition according to claim 20, wherein said coating composition is formulated to provide, after cure, a coating selected from the group consisting of outer primary coatings, colored outer primary coatings, ink coatings, bundling materials, ribbon matrix materials and colored matrix materials.

24. A radiation-curable composition according to claim 1, wherein said composition, after radiation-curing to attain at least 90% of its maximum secant modulus, has a film-to-film coefficient of friction of less than about 1.0.

25. A radiation-curable composition according to claim 20, wherein the amount of said oligomer is about 20 wt. % to about 60 wt. %.

26. A radiation-curable composition according to claim 20, wherein said composition is substantially urethane-free.

27. A radiation-curable composition according to claim 20, wherein at least one of said monomer diluents comprises a structure selected from the group consisting of an aromatic group, a bicyclic ring, a lactam ring and a lactone ring.

28. The composition of claim 1, wherein said composition, after cure, has a glass transition temperature of at least about 40° C.

29. The composition of claim 1, wherein said secant modulus is greater than 400 MPa.

30. The composition of claim 1, wherein said composition, after cure, has a film-to-stainless steel coefficient of friction of less than 1.2.

31. The composition of claim 1, wherein said composition comprises at least one component selected from the group consisting of vinyl caprolactam, ethoxylated bisphenol A diacrylate, phenoxyethyl acrylate, and isobornyl acrylate.

32. The composition of claim 1, wherein said at least one radiation-curable functional group is selected from the group consisting of acrylate functional groups, methacrylate functional groups, and N-vinyl functional groups.

33. The optical fiber of claim 19, wherein said secant modulus is greater than 400 MPa.

34. The fiber of claim 19, wherein said composition comprises at least one component selected from the group consisting of vinyl caprolactam, ethoxylated bisphenol A diacrylate, phenoxyethyl acrylate, and isobornyl acrylate.

35. The fiber of claim 19, wherein said at least one radiation-curable functional group is selected from the group consisting of acrylate functional groups, methacrylate functional groups, and N-vinyl functional groups.

36. The optical fiber of claim 19, wherein said composition, after cure, has a film-to-stainless steel coefficient of friction of less than 1.2.

37. The optical fiber of claim 19, wherein said composition, after cure, has a film-to-film coefficient of friction of less than 1.1.

38. The composition of claim 20, wherein said secant modulus is greater than 400 MPa.

39. The composition of claim 1, wherein said composition, after cure, has a film-to-film coefficient of friction and a film-to-stainless steel coefficient of friction, said film-to-film coefficient of friction being higher than said film-to-stainless steel coefficient of friction.

40. The optical fiber of claim 19, wherein said composition, after cure, has a film-to-film coefficient of friction and a film-to-stainless steel coefficient of friction, said film-to-film coefficient of friction being higher than said film-to-stainless steel coefficient of friction.

41. The composition of claim 20, wherein said composition, after cure, has a film-to-film coefficient of friction and a film-to-stainless steel coefficient of friction, said film-to-film coefficient of friction being higher than said film-to-stainless steel coefficient of friction.

* * * * *